US008112557B2

(12) United States Patent
Wideman

(10) Patent No.: US 8,112,557 B2
(45) Date of Patent: Feb. 7, 2012

(54) METHOD AND APPARATUS FOR TAPE DRIVE DATA LOGGING

(75) Inventor: Roderick B. Wideman, Shakopee, MN (US)

(73) Assignee: Quantum Corporation, San Jose, CA (US)

( * ) Notice: Subject to any disclaimer, the term of this patent is extended or adjusted under 35 U.S.C. 154(b) by 172 days.

(21) Appl. No.: 12/331,882

(22) Filed: Dec. 10, 2008

(65) Prior Publication Data

US 2010/0142071 A1 Jun. 10, 2010

(51) Int. Cl.
*G06F 3/00* (2006.01)
(52) U.S. Cl. ............. 710/19; 710/15; 710/18; 710/74
(58) Field of Classification Search .............. None
See application file for complete search history.

(56) References Cited

U.S. PATENT DOCUMENTS

| | | | |
|---|---|---|---|
| 5,210,851 A * | 5/1993 | Kato et al. ............. 360/48 |
| 6,058,494 A | 5/2000 | Gold | |
| 6,640,278 B1 | 10/2003 | Nolan | |
| 6,715,031 B2 | 3/2004 | Camble | |
| 7,206,873 B1 * | 4/2007 | Hennecken ............. 710/58 |
| 7,275,097 B2 * | 9/2007 | Peake et al. ............. 709/223 |
| 7,797,751 B1 * | 9/2010 | Hughes et al. ............. 726/26 |
| 2005/0091369 A1 * | 4/2005 | Jones ............. 709/224 |
| 2005/0246136 A1 | 11/2005 | Topham | |
| 2006/0010286 A1 | 1/2006 | Topham | |
| 2008/0086561 A1 * | 4/2008 | Dang et al. ............. 709/224 |
| 2009/0217169 A1 * | 8/2009 | Takahashi et al. ............. 715/733 |

OTHER PUBLICATIONS

Graham, Glenn, "Using NFS for Networked Backups," Mar. 6, 2003, LinuxDevCenter.com, pp. 1-5.*

* cited by examiner

*Primary Examiner* — Eron J Sorrell
(74) *Attorney, Agent, or Firm* — Baker Botts L.L.P.

(57) ABSTRACT

Method and apparatus for logging of data within a data storage system, such as a tape drive library. The tape drive library includes a central storage (memory) providing storage space assigned to each tape drive in the tape drive library and allowing each tape drive to directly store data there, that is to log data files. The logging of the data files is at the instigation of each tape drive and not via polling, so as to perform logging synchronous with tape drive events. In one version, the tape drives are coupled to the central storage via an Ethernet network and the log files conform to a standard file protocol, such as a network file system.

19 Claims, 3 Drawing Sheets

METHOD AND APPARATUS FOR TAPE DRIVE DATA LOGGING

FIELD OF THE INVENTION

This disclosure relates to data storage systems and more specifically to logging of data in a data storage system, especially when using magnetic tape drives.

BACKGROUND

In automated magnetic tape drive "libraries", typically the controller for the library communicates with the associated tape drives via a serial data interface for the purpose of detecting tape drive status and issuing certain commands and requests to the tape drives. The term "library" has a particular meaning in this context. Previously, a standalone tape drive was typically used to back up data stored in a computer. However, more recently tape drive "libraries" have become more widely used because of their greater capacity. A tape drive library (or "tape library") includes several tape drives and a number of associated media storage slots. Magnetic tape media (tape cartridges) are stored in the media slots and are transferred to the tape drives typically by a robot as required for read/write operations.

One type of data available from a tape drive is so-called "log" or "logging" data. Log data typically provides an accounting of activity that the drive performed or experienced and can be useful in troubleshooting the drive. Special forms of log data are often referred to as "dumps" since the represent a dump of a large quantity of data stored at the tape drive at a particular time. Sometimes log and dump data can be very large amounts of data, but tape drives typically have a limited amount of storage resources in the tape library available to retain such data.

Further, other issues relate to this logging data. One is that the tape library controller has to determine when to retrieve the data from the individual tape drives, typically by polling (interrogating) the drives through the tape drive's serial data interface(s). It is to be appreciated that the tape drives are connected to the library controller via a data network of some type, which connects to each individual tape drive through its serial data interface. This often creates a delay from when useful logging information is available at the tape drive until it is retrieved. Sometimes this causes important logging information to be lost either because the library controller did not timely retrieve the log data or the drive itself did not have enough local resources (memory) available to store all the relevant log data or both. Another problem is that the amount of available logging data, especially in the case of a dump, may be excessive to retrieve it efficiently via the relatively slow serial data interface.

In the past, these problems have been addressed in one approach such that when the library controller decides to retrieve the log data from the individual tape drives, it issues a command such as "SCSI Read Buffer" (or equivalent) via a serial data protocol, such as ADI (Automation Drive Interface). Alternately, this command is issued via the host interface, such as Fibre Channel. For larger amounts of log data, such as a dump, typically a particular tape cartridge has to be mounted in a drive in order for the tape drive to write the data to the tape cartridge for purposes of logging and then the tape cartridge has to be transported elsewhere for analysis. Each of these approaches is slow and prone to the above-indicated efficiencies.

To put this another way, as the complexity of storage systems increases, identifying faults and improving performance of such systems has become more difficult. Manufacturers of data storage components, such as tape drives, usually provide information regarding the expected performance of the unit and if the user believes the actual performance of the system in use is not the same as the specified performance, he wants to determine causes of performance deficiencies. Typically in order to identify which components of the storage system may be responsible for sub par performance, the operator of the library runs particular software tools for diagnostic purposes. However use of such tools has drawbacks, such as again a particular tape cartridge has to be installed in a tape drive at the time when data is to be logged.

SUMMARY

The present inventor has identified a need for an improved method of data logging within the context of a tape library. This is accomplished here using a method of transferring activity data, that is log data, from one of a number of tape drives associated with the tape library to the tape library controller, which is coupled thereto by a network. Typically the network in this case is an Ethernet or equivalent (parallel data) network. This is useful with drives having an Ethernet (parallel data) interface rather than the above mentioned serial interface, but this is not a requirement. The present method does not require polling the tape drives, but instead originates the logging data from the tape drives and sends it to the tape library controller at a time determined by each tape drive. This obviates a problem of insufficient local data storage at a particular tape drive for logging data and ensures that all relevant logging data is sent to the tape library controller promptly. Thereby the need for polling by the controller is eliminated.

In addition to having at least in some embodiments a parallel data (e.g., Ethernet) interface to the network connected to the tape library controller, also in this case each tape drive is provided with a software module (computer code) referred to here as a network file system client. A network file system host is associated with the tape library controller. Each tape drive, as determined by the availability of its log data, transmits its log data via its network file system client through the interface to the tape library controller where it is stored in associated memory. Moreover, each tape drive has assigned to it at the tape library controller a pathname. This pathname is equivalent to a name of a directory of files. Hence an associated storage area is assigned to each tape drive at the tape drive library controller for storing its log files. Typically these log files are stored on a disk drive or another tape drive or in semiconductor memory.

DETAILED DESCRIPTION

Figure 1:
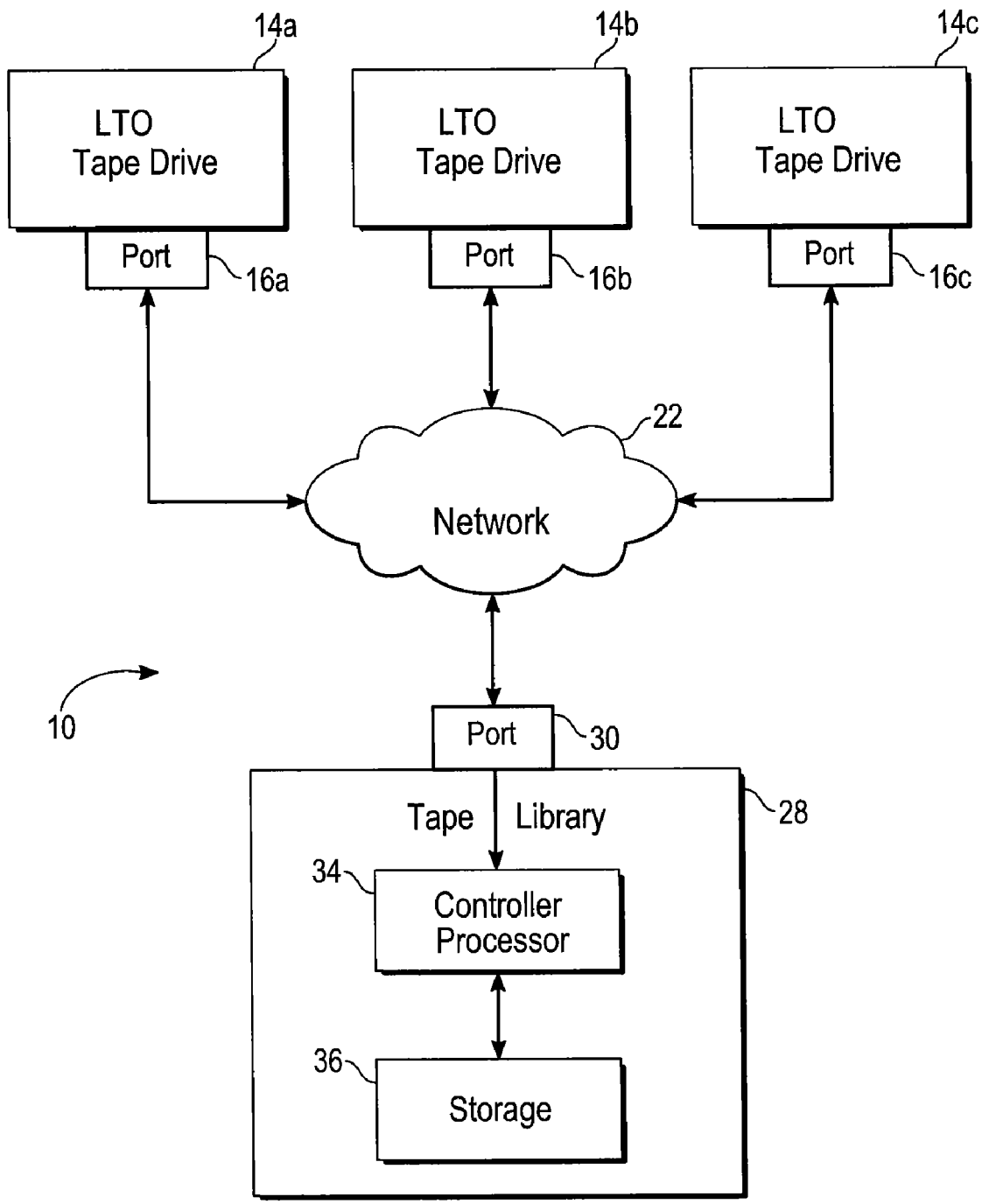
FIG. 1 shows a prior art tape drive storage system (library).

FIG. 1 shows in a prior art a typical data storage system 10 (tape library). This includes a plurality of tape drives 14a, 14b and 14c. It is to be understood that these are typically tape drives for storing data of the type used in the computer field. In this case the tape drives each conform to the LTO standard. LTO stands for "Linear Tape Open". This is an industry standard. Such tape drives are currently exist, but the present disclosure is not restricted to use of LTO type tape drives.

In FIG. 1, ports 16a, 16b and 16c are conventional serial data ports. In this case a serial data network 22 is connected also to the tape library controller port 30, which is also e.g. a serial port, and which connects to the tape library controller 28, typically a computer/server-type device which has its own processor 34 and associated storage or memory 36 which is for instance a disk drive or semiconductor storage. However such a system has the deficiencies indicated above since it requires polling the drives 14a, 14b, 14c to obtain logging data to be transmitted to the controller 28.

In accordance with the present invention, a new capability is provided for purposes of logging in the context of a FIG. 1 type system. This is referred to here as "extended logging". Extended logging operates by providing each tape drive access to the network of the library and to a directory (i.e., a pathname) via a network file system (NFS) in the controller. Each tape drive has an associated NFS client, which is a software module of a type commercially available, to perform file operations and to transmit the tape drive log data to storage associated with the library controller. Each tape drive is assigned a pathname to which to direct its own file operations, such as create, open, write or close a file. The files are typically the log data. The controller processor makes provisions to limit the amount of controller storage consumed by a particular tape drive as needed, that is it partitions available log data storage amongst the tape drives, which partitioning is done either statically or dynamically.

Examples of the types of data logging performed using extended logging are, for instance, host command logging (i.e., log each SCSI command issued by the host associated with the tape drive and also the response from the particular tape drive to which the SCSI command is directed); error logging (i.e., logs exception conditions as encountered by each particular tape drive); and dumps (i.e., these are either triggered by a particular event or a request of the controller).

Providing each tape drive with direct network file system access solves the problem identified above of missing (not storing) asynchronous log data information. In other words, the tape library controller no longer must poll the tape drives for log events or data. Also by using an Ethernet or equivalent network, this addresses the performance limitations of prior art serial data ports.

Using the above disclosed network based approach for log dumps allows the dump data to be stored at the same time as significant tape drive events, such as significant firmware errors, failed tape drive components such as read/write heads, or unrecoverable operating errors. Thereby there is no need for dumps to be retrieved by the controller later, at which time key log data may already have been lost. Even if storing log dumps asynchronously as described here is not practical in some embodiments, it is still more efficient to retrieve dumps via the high performance Ethernet network versus mounting a particular tape cartridge in a drive when the error condition is later determined.

Another way of describing this is that the tape library provides log data storage for each of its tape drives in the tape library and allows each individual tape drive to directly store data at that storage, that is to log files. This overcomes the limitations with prior art tape libraries as described above for maintaining log information such as insufficient storage as well as the current cumbersome methods of retrieving the log information such as a dump or extraction via the slow serial interface.

Further in accordance with the invention, the network is an Ethernet (parallel data) network of the type compatible with next generation LTO-5 tape drives. Ethernet is a computer network standard capable of relatively high capacity and uses a parallel data interface rather than a serial interface. Hence it provides a relatively fast transmission of large quantities of data.

Figure 2:
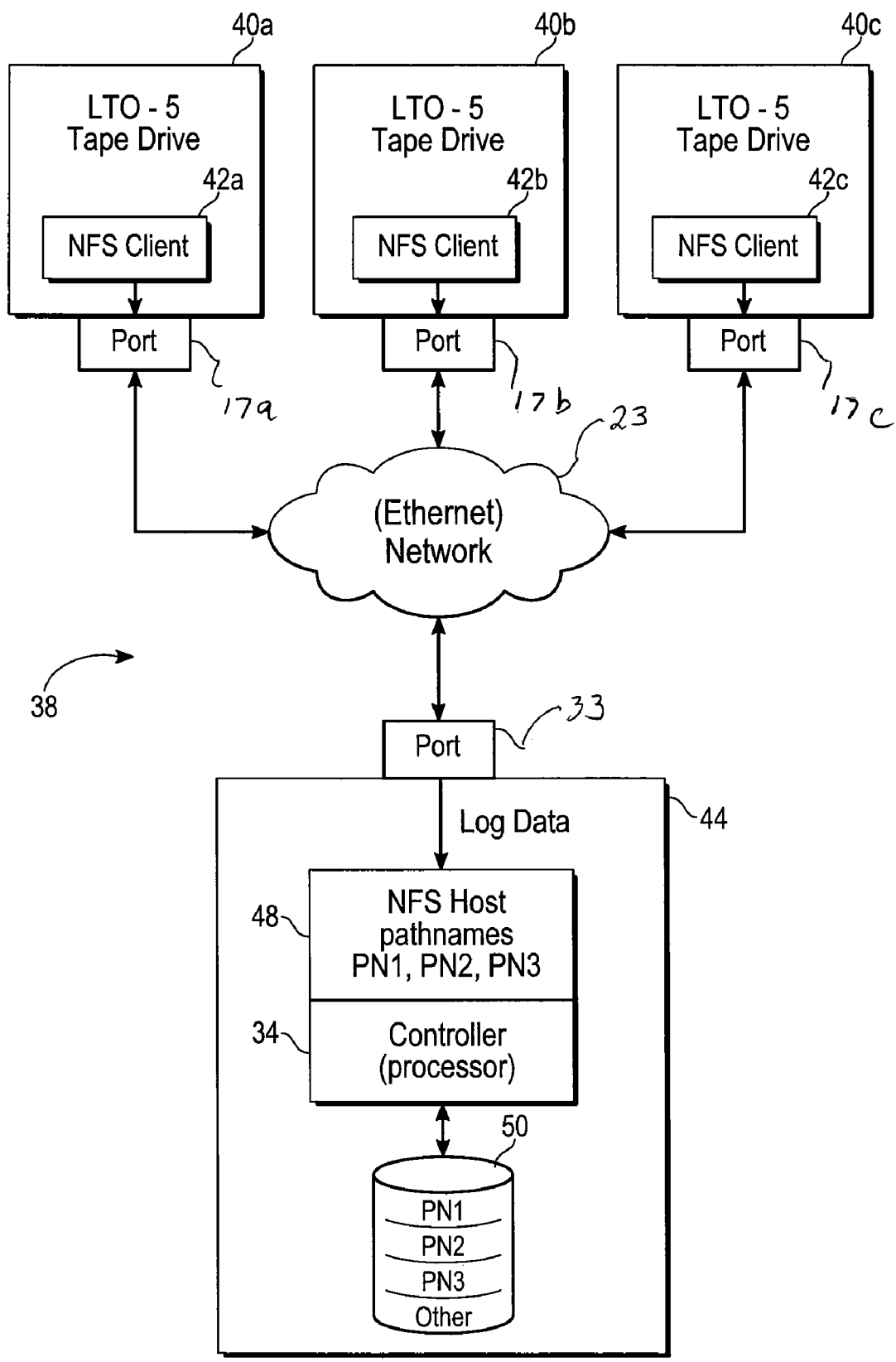
FIG. 2 shows a tape drive storage system in accordance with this invention.

FIG. 2 therefore shows a data storage system 38 in accordance with the invention. Tape drives 40a, 40b and 40c conform in this example to e.g. the LTO-5 standard and are partially the same as those in FIG. 1 but with the addition of Ethernet (parallel data) ports 17a, 17b, and 17c. Here each tape drive also includes a network file system client 42a, 42b and 42c. The ports 17a, 17b, 17c are connected conventionally to Ethernet network 23 which connects to the tape library controller 44 via its (Ethernet) port 33. In this case the log data as shown is logged into an NFS host 48 in the controller 44 which defines a plurality of pathnames PN1, PN2, PN3 with one pathname being made available for each tape drive 40a, 40b, 40c. In this case "pathname" is a synonym for a directory of files as conventional in the computer field. The processor portion of controller 44 is conventional. Associated with controller 44 is a storage 50 for the log data where each pathname PN1, PN2, PN3 has its own assigned storage area in storage 50. Of course the present system is not limited to three tape drives and three pathnames, but this is merely exemplary. In a typical system there would be more.

The generic term "network file system" in the computer field refers to any computer file system (embodied in computer software) that supports sharing of files or other computer resources as persistent storage over a computer network. This uses a centralized file system which effectively makes transparent the dispersion of servers and storage devices. That is, the client interface, here referred to as a "client," used by the various programs does not distinguish between local and remote files. Such systems are commercially available. One is provided by Sun Microsystem and is referred to as Network File System. Others are Andrew File System (AFS), NetWare Core Protocol (NCP), and Server Message Block (SMB). Again this is not limiting. Conventionally these consist of a client and a host as in FIG. 2 with typically a number of clients being associated with each host. These are commercially available software and so not further described here.

Figure 3:
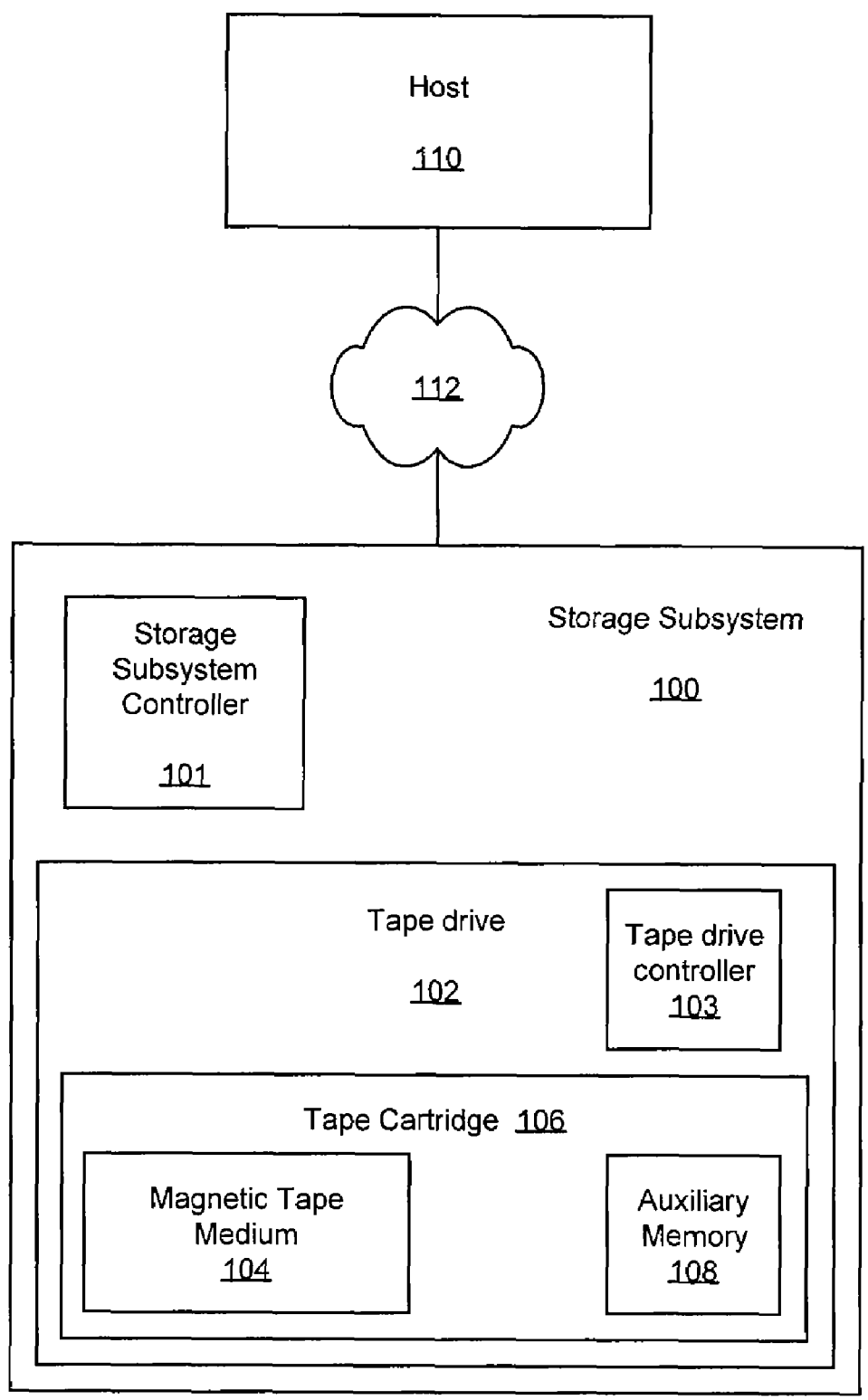
FIG. 3 shows a detail of conventional type tape drive storage system also as used in accordance with the invention.

Storage subsystems as described above for use with removable media, such as magnetic tape or disc drives, optical tape or disc drives, and the like, are widely used for storing information in digital form. With reference to FIG. 3, an exemplary generic storage subsystem 100 including a magnetic tape drive 102 and removable magnetic tape cartridge 106, is described. Storage subsystem 100 may include, e.g., a PC server, server class machine, mainframe, desktop computer, or the like. Storage subsystems 100 may include a storage subsystem controller 101 for controlling one or more tape drives 102 contained within the storage subsystem 100 and for controlling other components of the storage subsystem 100. Such a system may be used in accordance with the invention.

The storage subsystem 100 may be coupled to a host system 110, which transmits I/O requests to the storage subsystem 100 via a host/storage connection 112. The host system 110 may comprise any computational device known in the art including, for example, a server class machine, a mainframe, a desktop computer, a laptop computer, a hand held computer, or a telephony device.

Tape drive 102 reads and writes data to the primary storage medium, shown in FIG. 3 as a magnetic tape medium 104 contained within a removable magnetic tape cartridge 106. The magnetic tape medium 104 typically comprises a thin film of magnetic material, which stores the data. The tape medium 104 may be moved by the tape drive 102 between a pair of spaced apart reels and past a data transducer to record or read back information. In one type of tape drive system, one of the reels is part of the tape drive 102 while the other reel is part of the removable tape cartridge 106. For this type of tape drive system, the reel which is a part of the tape drive 102 is commonly referred to as a take-up reel, while the reel which is a part of the tape cartridge 106 is commonly referred to as a cartridge reel. Upon insertion of the tape cartridge 106 into the tape drive 102, the magnetic tape medium 104 on the cartridge reel is coupled to the take-up reel of the tape drive 102. Subsequently, prior to removing the tape cartridge 106 from the tape drive 102, the storage tape 104 is rewound onto the cartridge reel and is then uncoupled from the take-up reel.

Tape drive 102 further includes a tape drive controller 103 for controlling, at least in part, data transfer operations. Tape drive controller 103 may further include or access a tape drive memory, which together may analyze and/or store historical event information. Further tape drive controller 103 may include or access logic for displaying the historical event information via a front panel of tape drive 103, as described in greater detail below.

In some tape storage subsystems, the removable tape cartridge 106 is provided with a non-volatile auxiliary memory 108 for storing data in a separate storage medium from the primary storage medium. This data is separate from and in addition to the data stored on the primary storage medium. This auxiliary memory 108 can be, for example, a solid state non-volatile memory such as an electrically erasable programmable read-only memory (EEPROM) or a flash memory which is contained in the housing for the tape cartridge 106. Auxiliary memory 108 may further store historical event information accessible by drive 102 and/or storage subsystem 100.

In this case the NFS clients 42a, 42b, 42c of FIG. 2 are each software code stored in memory (not shown) and executed by a processor conventionally resident in each tape drive and also not shown. It is understood that tape drives of this type are relatively "intelligent" so that in addition to their mechanical parts and read/write circuitry also include conventionally a processor and some local storage (memory) used for storing the log data and other purposes. Again this is not shown, being conventional. In FIG. 2, the NFS host software 48 is conventional computer code stored in memory resident in the controller 44 and executed by the processor 34 conventionally associated with the controller 44. The term "network file system" as used here also refers to File Transfer Protocol (FTP) which is another way of maintaining files in a storage system.

This description is exemplary and is not intended to be limiting. Further modifications and improvements will be apparently to those skilled in the art in light of this disclosure and are intended to fall within the scope of the appended claims.

The invention claimed is:

1. A method of transferring activity data from one of a plurality of tape drives to a controller coupled to the tape drives by a network, each tape drive comprising a network file system client and a port to the network, the method comprising:
   assigning each tape drive a pathname in a network file system;
   receiving, at the controller, activity data for a tape drive transmitted from the tape drive's network file system client and port to the controller via the network; and
   storing the transmitted activity data at the controller at the pathname assigned to the tape drive.

2. The method of claim 1, wherein the network is an Ethernet network.

3. The method of claim 1, wherein the activity data is at least one of host commands, errors, and a dump of data stored on the tape drive.

4. The method of claim 1, wherein the transmitting is initiated by the network file system client.

5. The method of claim 1, further comprising associating a storage region at the controller with each tape drive.

6. The method of claim 1, wherein the tape drives conform to an LTO standard.

7. The method of claim 1, wherein the transmitting is over an Ethernet network.

8. The method of claim 1, wherein the network file system uses File Transfer Protocol (FTP).

9. The method of claim 1, wherein the controller is a library controller, and the tape drives are in a tape library.

10. A computer readable medium storing computer code operable to, when executed:
    assign a pathname in a network file system to each of a plurality of tape drives, each of the plurality of tape drives comprising a network file system client and a port to the network;
    receive transmitted activity data for one of the plurality of tape drives, transmitted to the controller from the tape drive's network file system client and port via the network; and
    storing the transmitted activity data at the controller at the pathname assigned to the tape drive.

11. A storage system comprising:
    a plurality of tape drives each having a network file system client and a port connectable to a network;
    a controller coupled to the network and including a network file system host with a pathname for each tape drive; and
    storage coupled to the controller;
    wherein each tape drive transmits activity data to the controller via its network file system client and port to store the activity data in the storage at its pathname.

12. The storage system of claim 11, wherein the network is an Ethernet network.

13. The storage system of claim 11, wherein the activity data is at least one of host commands, errors, and a dump of data stored on the tape drive.

14. The storage system of claim 11, wherein the transmitting is initiated by the network file system client.

15. The storage system of claim 11, further comprising a storage region at the controller associated with each tape drive.

16. The storage system of claim 11, wherein the tape drives conform to the LTO standard.

17. The storage system of claim 11, wherein the network file system uses File Transport Protocol (FTP).

18. The storage system of claim 11, wherein the controller is a library controller, and the tape drives are in a tape library.

19. A controller for a data storage system having a plurality of tape drives coupled to the controller by a network, the controller comprising:
    a processor coupled to the network and comprising an associated network file system host comprising a pathname for each of the tape drives; and
    storage coupled to the processor;
    wherein the processor receives, via the network, activity data for each tape drive and stores the activity data in the storage at the pathname for the tape drive.

* * * * *